Sept. 24, 1957  W. S. JOSEPHSON  2,807,079
DEVICE FOR INSTALLING SEALS
Filed Aug. 18, 1953  2 Sheets-Sheet 2
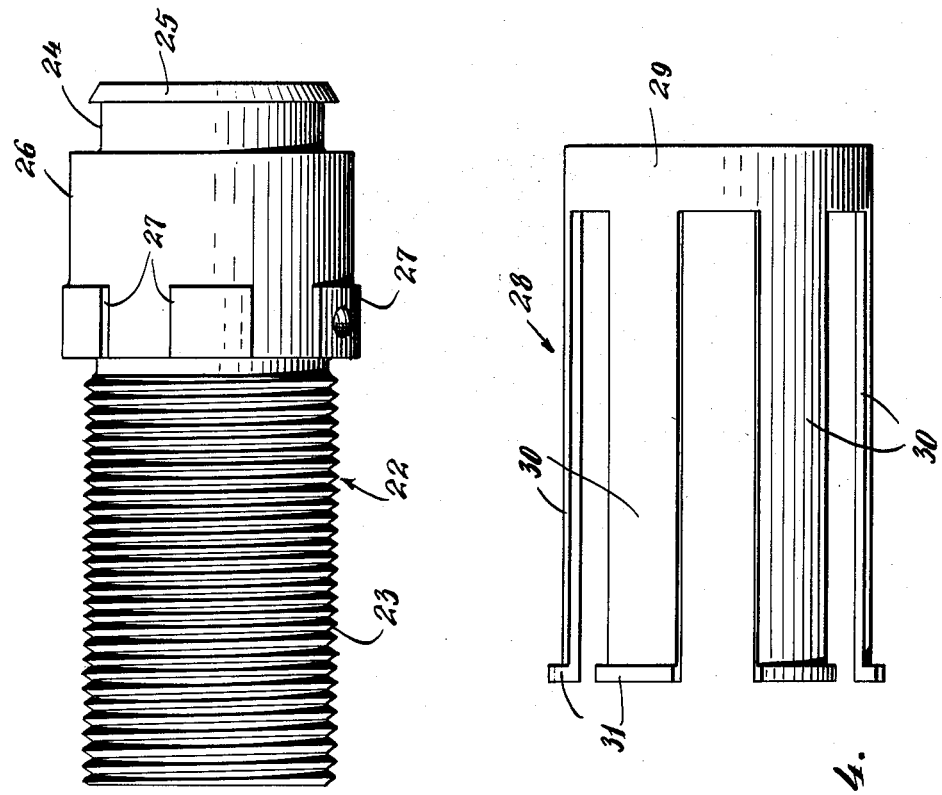
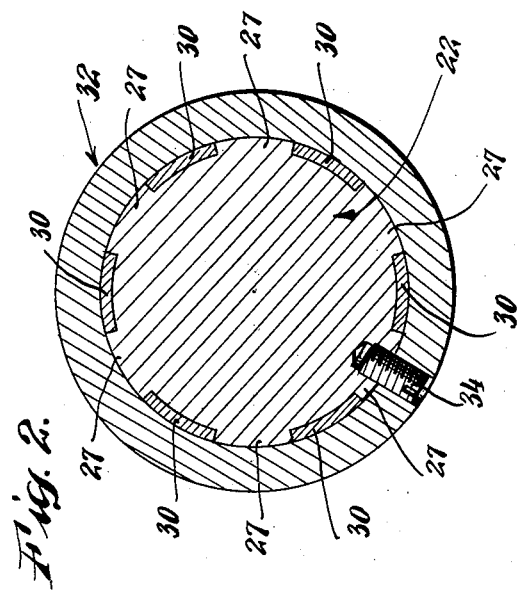

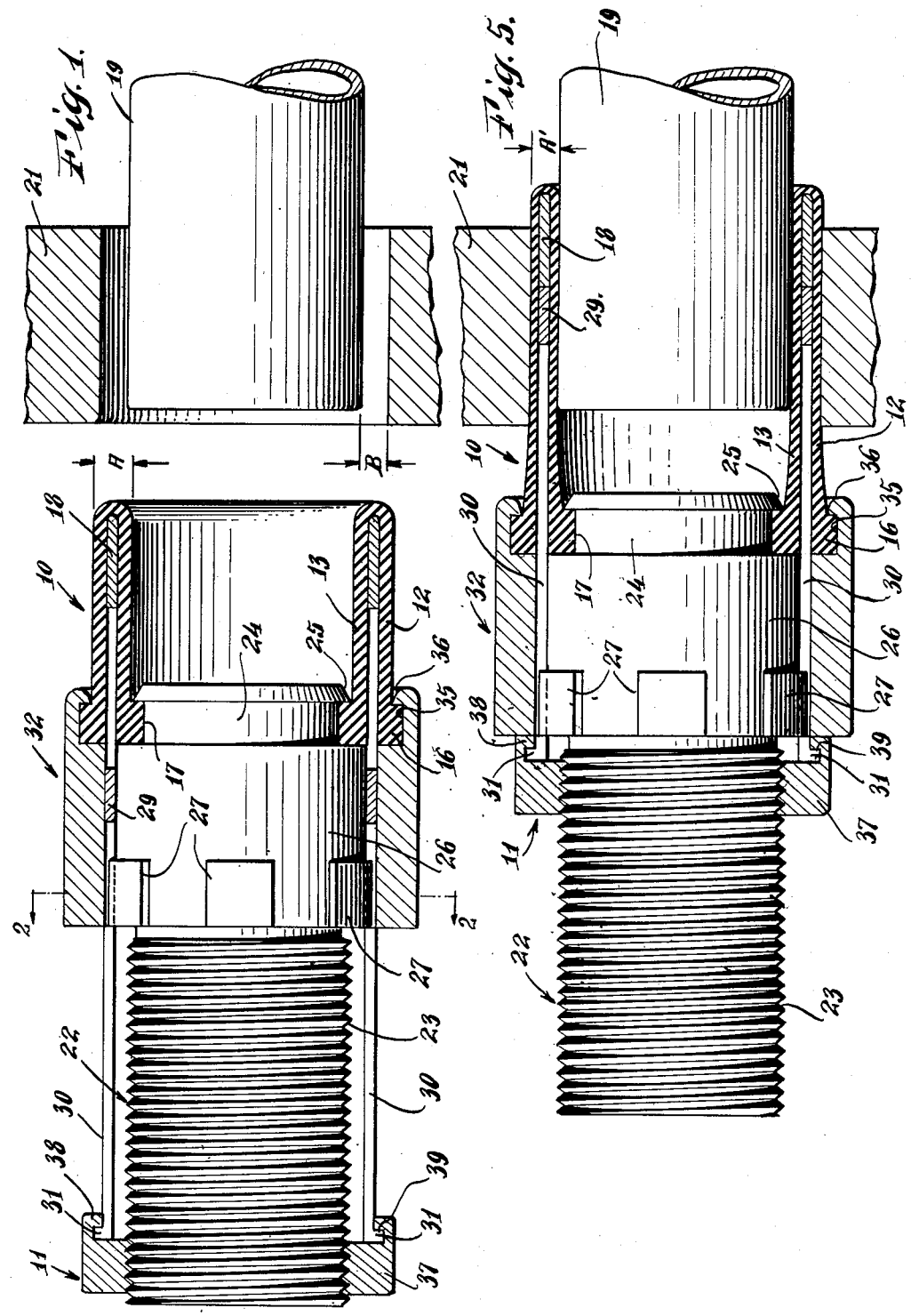

United States Patent Office 2,807,079
Patented Sept. 24, 1957

2,807,079
DEVICE FOR INSTALLING SEALS

Walter S. Josephson, Schwenksville, Pa., assignor to Greene, Tweed & Co., North Wales, Pa., a corporation of New York Application August 18, 1953, Serial No. 375,033

6 Claims. (Cl. 29—235)

The present invention relates generally to seals, and is particularly directed to an improved seal and installing device therefor for use in tube sheet closures of heat transfer equipment.

Heretofore, a seal of the described character has been proposed which is formed of an elastic material, such as, for example, synthetic rubber or neoprene and the like, and includes two radially spaced apart smooth cylindrical walls joined together at one end and having a filler ring placed in the annular space between the cylindrical walls. The combined normal thickness of the cylindrical walls and the filler ring is greater than the annular clearance between the outer surface of the tube and the hole or opening of the tube sheet in which the end of the tube is to be sealed. In order to install the seal between the outer surface of the end of the tube and the opening of the tube sheet, the seal is axially stretched to thereby reduce the thicknesses of the cylindrical walls until the combined thickness of such walls and the filler ring is less than the clearance or play of the tube end within the tube sheet opening. After the axially stretched seal has been inserted between the tube end and the tube sheet opening, the force causing axial stretching of the seal is removed and the cylindrical walls then expand radially in response to their axial contraction and, with the filler ring, provide a tight seal around the tube end in the tube sheet opening. In order to effect the axial stretching of the seal preparatory to extending the seal around the tube end within the tube sheet opening, an inserting tool has been provided which includes gripping jaws capable of radial movement to grasp the free end edge portions of the smooth cylindrical wall of the seal and a circular blade which is movable axially between the gripping jaws and into the annular space of the seal to engage axially against the filler ring and effect axial movement of the latter away from the gripped end edge portions of the seal walls. However, the mechanisms required for producing the radial movements of the gripping jaws and the axial movements of the circular blade in the existing inserting tool result in a tool which is complex and cumbersome.

Accordingly, an object of the present invention is to provide an improved seal of the described character which is arranged to be inserted around a tube end within the opening of a tube sheet closure by a relatively simple and easily operated inserting tool.

Another object is to provide a seal and inserting tool of the described character wherein a circular blade is movable axially into the annular space of the seal and serves to simultaneously lock the seal walls in suitable gripping jaws and effect axial stretching of the seal.

A further object is to provide a seal of the described character and an inserting tool therefor having a minimum of movable parts to simplify the manufacture, maintenance and operation thereof.

In accordance with the present invention, the above, and other objects, features and advantages appearing in the following detailed description, are achieved by providing a seal formed of an elastic material and which includes two radially spaced apart cylindrical walls joined together at one end and having inwardly and outwardly directed annular ribs or collars at the other ends of the inner and outer walls, respectively, with a rigid filler ring being disposed in the annular space between the seal walls adjacent the joined together ends of the latter; and an inserting tool for the seal including a cylindrical body having external threads along a substantial portion of the length thereof and an outwardly opening annular groove adjacent one end, a bearing surface on the cylindrical body between the annular groove and the threaded portion with axial splines projecting from the bearing surface at the end of the latter adjacent the threaded portion, a circular blade slidable over the bearing surface and having axial arms extending therefrom between the splines to resist turning of the blade with the free ends of such arms being flanged, a blade actuating ring screwed on the threaded portion of the body and having an inwardly opening annular groove receiving the flanged ends of the arms so that rotation of the ring relative to the body produces axial displacement of the blade, and an outer gripping jaw member in the form of a cylinder fitting over the circular blade and fixed to the body and having an inwardly opening annular groove at one end registering axially with the annular groove of the body so that the registering annular grooves are adapted to receive the annular collars on the cylindrical seal walls with the collars being locked radially within the respective annular grooves when the circular blade and the axial arms extending therefrom enter into the annular space between the cylindrical seal walls.

In order that the invention may be fully understood, an illustrative embodiment thereof is hereinafter described in detail, merely by way of example, and is shown in the accompanying drawings forming a part hereof, and wherein:

Fig. 1 is an axial sectional view of a seal and inserting tool therefor embodying the present invention and shown with the seal engaged in the inserting tool but in its normal or non-stretched condition;

Fig. 2 is a transverse sectional view taken along the line 2—2 of Fig. 1;

Fig. 3 is an elevational view of a body included in the inserting tool of Fig. 1;

Fig. 4 is an elevational view of a stretching blade member included in the inserting tool of Fig. 1; and Fig. 5 is an axial sectional view similar to Fig. 1, but showing the seal in its axially stretched condition and inserted in an opening of a tube sheet closure around a tube end.

Referring to the drawings in detail, a seal of the described character and an inserting tool therefor embodying the present invention are there illustrated and generally identified by the reference numerals 10 and 11, respectively. As seen in Fig. 1, the seal 10 includes two cylindrical walls 12 and 13 which are formed of an elastic material, such as, for example, synthetic rubber or neoprene and the like, and are spaced radially apart to define an annular space 14 therebetween. The cylindrical walls 12 and 13 are joined together at one end, as at 15, and the other ends of the walls are radially enlarged in order to provide annular collars 16 and 17 on the outer and inner surfaces, respectively, of the outer and inner walls 12 and 13. The seal 10 is completed by a circular filler ring 18 which is disposed within the annular space 14 and abuts against the joined together ends 15 of the inner and outer walls.

As seen in Fig. 1, the combined thicknesses A of the cylindrical walls 12 and 13 and the filler ring 18 are normally greater than the annular clearance B existing between the tube end 19 and the opening 20 of the tube sheet closure 21. Thus, the seal 10, in its normal condition, could not be inserted into the clearance B to provide a seal between the tube end 19 and the tube sheet closure 21. Such insertion of the seal 10 can be accomplished only after the combined thicknesses A have been reduced to a dimension less than the clearance B. Reduction of the combined thicknesses A can be achieved by axially stretching the elastic walls 12 and 13 to reduce the radial thicknesses thereof.

In accordance with the present invention, the inserting tool 11 is constructed to grip the seal 10 at the end thereof having the collars 16 and 17, and then to effect axial stretching of the walls 12 and 13 in the direction away from the gripped collars 16 and 17 so that the axially stretched seal may then be inserted into the opening 20 around the tube end 19. The inserting tool 11 includes a body, generally identified by the reference numeral 22 and shown in detail in Fig. 3 of the drawings. The body 22 is generally of cylindrical configuration and includes a substantial threaded portion 23 extending from one end thereof, and an outwardly opening annular groove 24 adjacent the opposite end thereof. The end of the body 22 adjacent the groove 24 is bevelled or inclined as at 25, and a cylindrical bearing surface 26 extends axially from the groove 24 toward the threaded portion 23. A circular series of circumferentially spaced apart and radially raised splines 27 extend from the bearing surface 26 at the end of the latter adjacent the threaded portion 23.

The inserting tool 11 also includes a blade element, generally identified by the numeral 28 and shown in detail in Fig. 4 of the drawing, and which is made up of a circular blade 29 dimensioned to slide over the bearing surface 26 and having circumferentially spaced apart, parallel axial arms 30 extending therefrom to be slidably received between the successive splines 27 (Fig. 2). The free ends of the axial arms 30 are outwardly flanged, as at 31, for a purpose hereinafter described in detail.

The tool 11 further includes an outer seal gripping member generally identified by the reference numeral 32 and having a generally cylindrical or tubular configuration with an inner diameter sufficiently large to fit over the splines 27 and to define an annular clearance or space 33 between the bearing surface 26 and the inner surface of the member 32 into which the circular blade 29 may be withdrawn. The outer seal gripping member 32 is held against axial and rotational movement relative to the body 22 by any suitable means, for example, by a set screw 34 (Fig. 2) extending threadably through the member 32 and into a suitable recess in one of the splines 27 on the body 22. The outer seal gripping member 32 is further formed with an inwardly opening annular groove 35 adjacent the end thereof remote from the splines 27 and in axial registration with the annular groove 24 of the body 22. The end of the member 32 adjacent groove 35 is bevelled or inclined, as at 36, so that the bevelled end edges 25 and 36 of the body 22 and member 32, respectively, define a converging annular entry into a radially enlarged annular space formed by the annular grooves 24 and 35.

The inserting tool 11 embodying the present invention is completed by an actuating ring 37 which is internally threaded and screwed upon the threaded portion 23 of the body 22. The actuating ring 37, at the side thereof facing toward the splines 27 on the body 22, is formed with an L-shaped flange 38 extending axially and then inwardly to define an inwardly opening annular channel 39 for receiving the flanges 31 on the free ends of the axial arms 30. Thus, the arms 30 are axially coupled to the actuating ring 37 so that the arms 30 and the circular blade 29 will move axially with the ring 37 as the latter is rotated upon the threaded body portion 23.

The operation of the seal 10 and the tool 11 embodying the present invention will be best understood by particular reference to Figs. 1 and 5 of the drawings. To begin with, actuating ring 37 is rotated on the threaded body portion 23 in the direction for disposing the actuating ring at the end of the body portion remote from the bevelled end edge 25. With the actuating ring thus disposed (Fig. 1), the circular blade 29 will be drawn into the annular space 33 between the bearing surface 26 and the inner surface of the member 32. The annular collars 16 and 17 of the seal 10 can then be axially urged through the converging annular entry defined by the bevelled edges 25 and 36 into engagement with the annular grooves 35 and 24, respectively. It is to be understood that the end portions of the elastic walls 12 and 13, during passage through the converging restricted annular entry defined by the bevelled edges 25 and 36, will be sprung together across the annular space 14 defined between walls 12 and 13 of the seal 10. When the collars 16 and 17 are disposed within the annular grooves 24 and 35, as in Fig. 1, the resiliency of the elastic material of which the walls 12 and 13 are formed, will cause the collars to spring radially outwardly and inwardly into the respective grooves to again open the space 14.

When it is desired to insert the seal 10 into the circular clearance B between a tube end 19 and the opening 20 of a tube sheet closure 21, the actuating ring 37 is rotated in the direction causing its axial movement, along the threaded portion 23, toward the bevelled end edge 25 of the body 22. Such axial movement of the ring 37 will cause a similar or corresponding axial movement of the circular blade 29 out of the annular space 33 of the tool and into the annular space 14 of the seal 10. As soon as the circular blade 29, and its following axial arms 30, have entered into the annular space 14, to fill the latter, the collars 16 and 17 will be radially locked within the annular grooves 35 and 24, respectively, so that the related end of the seal 10 will be firmly held between the outer gripping member 32 and the body 22. Further axial movement of the circular blade 29 into the annular space 14 between the walls 12 and 13 of the seal will bring the circular blade into axial engagement with the edge of the filler ring 18 of the seal to displace the filler ring axially in the direction away from the securely held collars 16 and 17. Thus, the cylindrical elastic walls 12 and 13 of the seal will be axially stretched, as shown in Fig. 5, to produce a corresponding reduction in the total or combined thicknesses A' of the walls 12 and 13 and the filler ring 18 until the reduced total thickness A' is less than the clearance B to permit the seal to be inserted into the opening 20 around the tube end 19. When the actuating ring 37 is subsequently rotated in the opposite direction to withdraw the circular blade 29 from within the seal to its original position (Fig. 1) in the annular space 33, the force causing axial stretching of the seal walls 12 and 13 is removed and these elastic walls then expand radially between the rigid filler ring 18 and the outer surface of the tube end 19 and the surface of the opening 20 to tightly seal the clearance B.

From the foregoing, it is apparent that the circular blade 29 and the arms 30 extending axially therefrom serve the dual function of applying an axial stretching force to the seal and of radially locking the collars 16 and 17 of the seal within the related grooves of the inserting tool. The performance of this dual function by the blade 29 and arms 30 makes it possible to provide relatively fixed seal gripping members on the inserting tool so that the movable members of the latter can be reduced merely to the actuating ring 37 and the assembly of the blade 29 and axial arms 30. Thus, a relatively simple and easily operated tool is provided for inserting the seal having the collars 16 and 17 thereon.

While a particular embodiment of the invention has been described in detail and illustrated in the accompanying drawings, it is to be understood that the present invention is not limited to that precise embodiment, and that various changes and modifications may be effected therein without departing from the scope or spirit of the invention as defined in the appended claims.

What is claimed is:

1. A tool for inserting an elastic seal having spaced apart inner and outer cylindrical walls joined together at one end and formed with inwardly and outwardly directed annular collars at the opposite ends of the inner and outer walls, respectively, and a filler ring disposed between the walls into an annular space around a tube end within an opening of a tube sheet closure; said tool comprising a body formed with an outwardly opening annular groove adjacent one end thereof, an outer gripping member extending around at least a portion of said body and having an inwardly opening annular groove therein in axial registry with said groove of the body, the inner surface of said outer gripping member being spaced from the outer surface of said portion of the body to define an annular space therebetween opening axially past said grooves at said one end of the body so that the annular collars of the seal can be inserted into said annular space through said one end with the seal walls flexed together and then accommodated in said grooves, a circular blade movable axially through said annular space of the tool to enter between the seal walls thereby to lock the collars radially in said grooves and then to act axially against the filler ring of the seal for axially stretching the seal walls to permit insertion of the seal in a tube closure sheet opening around a tube end, and means operative to effect axial movement of said blade relative to said body and outer gripping member.

2. A tool according to claim 1; wherein the outer and inner edges of said body and said member, respectively, at said one end of the tool are bevelled to facilitate insertion of the collars of the seal into said annular space of the tool.

3. A tool according to claim 1; wherein said body has raised and circumferentially spaced splines extending therefrom to maintain said inner surface of the outer gripping member in spaced relation to said outer surface of said portion of the body.

4. A tool according to claim 3; wherein said circular blade is slidable on said portion of the body and has axial arms extending therefrom and passing slidably between said splines; and wherein said means for effecting axial movement of the blade is axially coupled to the free ends of said axial arms.

5. A tool according to claim 4; wherein said means for effecting axial movement of the blade includes external threads on a section of said body remote from said portion, an actuating ring threaded on said section of the body to move axially relative to said body in response to rotation of said ring, and means coupling said ring to said free ends of said axial arms.

6. A tool according to claim 5; wherein said coupling means includes outwardly directed radial flanges on said free ends of the axial arms, and an L-shaped annular flange on the periphery of said actuating ring having an axial portion extending from the ring in the direction toward said blade and a radial portion extending inwardly from said axial portion to define an inwardly opening annular channel receiving said radial flanges on the free ends of the axial arms.

References Cited in the file of this patent

UNITED STATES PATENTS

| | | |
|---|---|---|
| 206,813 | Mead | Aug. 6, 1878 |
| 337,434 | Rankin | Mar. 9, 1886 |
| 1,778,399 | Phelps | Oct. 14, 1930 |
| 2,422,549 | Hogin | June 17, 1947 |
| 2,455,202 | Ware | Nov. 30, 1948 |
| 2,630,343 | Jones et al. | Mar. 3, 1953 |
| 2,660,780 | Beck | Dec. 1, 1953 |
| 2,670,705 | Herrold | Mar. 2, 1954 |

FOREIGN PATENTS

| | | |
|---|---|---|
| 682,859 | Great Britain | Nov. 19, 1952 |